United States Patent
Fry et al.

(10) Patent No.: US 7,026,435 B2
(45) Date of Patent: Apr. 11, 2006

(54) WATER-DISPERSIBLE, HYDROPHOBIC POLYALKYLENEIMINE POLYAMIDE FIBERGLASS LUBRICANT, PROCESS FOR PRODUCING THE SAME, AND METHOD OF USE THEREFOR

(75) Inventors: Douglas F. Fry, Charlotte, NC (US); Frank Norman Tuller, Simpsonville, SC (US)

(73) Assignee: Cognis Corporation, Cincinnati, OH (US)

( * ) Notice: Subject to any disclaimer, the term of this patent is extended or adjusted under 35 U.S.C. 154(b) by 281 days.

(21) Appl. No.: 09/875,237

(22) Filed: Jun. 6, 2001

(65) Prior Publication Data

US 2002/0017627 A1 Feb. 14, 2002

Related U.S. Application Data

(60) Provisional application No. 60/210,293, filed on Jun. 8, 2000.

(51) Int. Cl.
- C08G 69/08 (2006.01)
- C08G 69/26 (2006.01)
- C08G 69/34 (2006.01)
- D02G 3/00 (2006.01)
- D06M 13/00 (2006.01)

(52) U.S. Cl. .............. 528/310; 528/329.1; 528/332; 528/335; 528/336; 528/339; 528/39.3; 8/115.6; 8/115.5; 252/400.5; 428/357; 428/364; 428/378; 428/394; 428/395; 524/60; 524/538; 524/606; 524/800; 524/802

(58) Field of Classification Search ........... 524/538, 524/600, 606, 800, 802, 60; 8/115.6, 115.51; 252/400.5; 428/357, 364, 378, 394, 395; 528/310, 329.1, 332, 335, 336, 339, 339.3
See application file for complete search history.

(56) References Cited

U.S. PATENT DOCUMENTS

| | | |
|---|---|---|
| 3,597,265 A | 8/1971 | Mecklenborg et al. |
| 3,932,363 A | 1/1976 | Lehmann et al. |
| 5,491,182 A | 2/1996 | Key et al. |
| 5,665,470 A | 9/1997 | Key et al. |
| 6,228,281 B1 | 5/2001 | Sage |
| 6,399,741 B1 * | 6/2002 | Fry et al. ............ 528/310 |

* cited by examiner

*Primary Examiner*—Kriellion A. Sanders
(74) *Attorney, Agent, or Firm*—John F. Daniels; Arthur G. Seifert

(57) ABSTRACT

Polymer derivatives based upon polyalkyleneimine backbones having from about 20% to about 60% of their reactive amino functionalities substituted by $C_{14-20}$ carboxylic acids, are disclosed. Fiber lubricants and/or sizing compositions comprising such polymer derivatives are also disclosed. The disclosed fiber lubricants exhibit excellent affinity for fiberglass fibers and have excellent hydrophobicity, while also providing excellent lubrication. Methods for preparing said derivatives are also disclosed. Also disclosed are methods for treating fibers using the polymer derivatives.

30 Claims, No Drawings

WATER-DISPERSIBLE, HYDROPHOBIC POLYALKYLENEIMINE POLYAMIDE FIBERGLASS LUBRICANT, PROCESS FOR PRODUCING THE SAME, AND METHOD OF USE THEREFOR

CROSS-REFERENCE TO RELATED APPLICATIONS

This application claims benefit of priority, under 35 U.S.C. §119(e), of U.S. Provisional Patent Application No. 60/210,293, filed Jun. 8, 2000, the entire contents of which are herein incorporated by reference.

BACKGROUND OF THE INVENTION

Fiber processing, including, for example, the manufacture of continuous strands from numerous monofilaments or individual fibers, usually involves the use of equipment which subjects the monofilaments, individual fibers and/or continuous strands to high speed, wherein the fiber materials are subjected to destructive abrasive forces which can be the result of both mutual abrasion between strands and/or between the strands and the equipment. At any rate, it is usual to provide some lubrication for the fibers. Fiber lubricants are commonly used during the production of many different materials, including fiberglass and synthetic fibers such as polyesters, polyolefins, polyacrylics, polyamides, etc. Fiber lubricants are typically applied to fibers as a component of a sizing composition, usually immediately after fiber formation, but before fibers are gathered into a bundle, and may also be added to fiber materials to provide lubricity during subsequent usage.

One class of fiberglass lubricants includes polyethyleneimine polyamides. Polyethyleneimine polyamides are commonly used to lubricate fiberglass. Polyethyleneimine polyamides generally provide lubricity which is at least adequate in that filaments breaking, i.e., fuzz formation is limited during processing and fiber tensile strength is generally improved. However, in some applications, such as, for example, structural loose-fill insulation and in standard insulation batts as well, coated fiberglass may be exposed to moisture, such as in the attics of homes, particularly in the southeastern United States, where temperatures and humidity can lead to moist air conditions and high levels of dew. In many applications, including insulation, protection of the fiberglass from attack by moisture is important to prevent degradation of the fibers. In some instances, silicones may be used due to their hydrophobicity. However, silicones can be incompatible with some fibers, in that additional surface active agents may be needed to achieve complete wetting of the surfaces.

Moreover, in addition to an adequate level of hydrophobicity, or moisture-protection, fiber lubricants for use with fiberglass fibers should have a high degree of affinity for the fiberglass. Unfortunately, many prior art fiberglass lubricants, with adequate lubricity, do not possess both a high affinity for fiberglass and a high degree of hydrophobicity.

Thus, there is a need in the art for a fiber lubricant with the advantageous lubricating properties of polyalkyleneimine polyamides, in addition to a high affinity for fiberglass fibers, as well as a high degree of hydrophobicity.

BRIEF SUMMARY OF THE INVENTION

The present invention relates to a polymer derivative, and more particularly, to a polyalkyleneimine polyamide which can be used as a fiber lubricant. Polymer derivatives in accordance with the present invention are particularly suitable as lubricants for fiberglass processing where the fiberglass may be subsequently exposed to damaging moisture. Polymer derivatives in accordance with the present invention, and lubricant and sizing compositions containing such polymer derivatives, exhibit excellent lubricating properties in addition to both a high affinity for fiberglass fibers and a moisture-protective level of hydrophobicity, as compared to commercially available polyalkyleneimine polyamide fiber lubricants.

It has been discovered, that the use of fatty acids of particular chain lengths in specified molar ratios of fatty acid to polyalkyleneimine, allows for the preparation of polyalkyleneimine polyamides with excellent lubricating properties, and both a high degree of hydrophobicity and high affinity for fiberglass.

One aspect of the present invention includes a polymer derivative which comprises a polyalkyleneimine backbone which has a number of reactive amino functionalities, each reactive amino functionality having at least one reactive hydrogen atom, wherein from about 20% to about 60% of the number of reactive amino functionalities have a substituent-compound substituted in place of the at least one reactive hydrogen atom, wherein the substituent-compounds are independently selected from carboxylic acids having from about 14 to about 20 carbon atoms. In certain preferred embodiments of this and other aspects of the present invention, the polyalkyleneimine backbone is a polyethyleneimine having a molecular weight of from about 1000 to about 1800. Additionally, in those and other preferred embodiments of this and other aspects of the present invention, the carboxylic acids comprise a mixture containing approximately a 50/50 blend of $C_{16}$ and $C_{18}$ carboxylic acids, which may also contain some unsaturated acids.

Another aspect of the present invention includes a polymer derivative prepared by a process which comprises reacting a polyalkyleneimine having a number of reactive amino functionalities with an amount of substituent-compounds comprising one or more carboxylic acids having from about 14 to about 20 carbon atoms, under conditions sufficient to derivatize from about 20% to about 60% of the reactive amino functionalities with the substituent-compounds.

Yet another aspect of the present invention includes a process for preparing a polymer derivative comprising: (a) providing a polyalkyleneimine having a number of reactive amino functionalities per mole, (b) reacting the polyalkyleneimine with an amount of substituent-compounds comprising one or more carboxylic acids having from about 14 to about 20 carbon atoms, wherein the amount of the substituent-compounds used is sufficient to derivatize from about 20% to about 60% of the number of reactive amino functionalities per mole of polyalkyleneimine. The present invention also includes polymer derivatives prepared by processes in accordance with this aspect of the invention.

Other aspects of the present invention include fiber lubricant compositions and sizing compositions comprising one or more polymer derivatives according to any one of the aspects or embodiments of the present invention.

The present invention also includes a method of lubricating a fiber material comprising providing a fiber material and contacting the fiber material with a polymer derivative according to any one of the aspects or embodiments of the present invention.

As used herein, the terms "react", "substitute", and "derivatize", and their various tenses, all synonymously refer to a chemical reaction between a substituent-compound (i.e., a carboxylic acid or an amine-protecting compound) and a reactive amino functionality of a polyalkyleneimine.

DETAILED DESCRIPTION OF THE INVENTION

Polyalkyleneimines useful in accordance with the present invention include any polyalkyleneimines having reactive amino functionalities suitable for reaction with, for example, a carboxylic acid, such as, for example, the polyalkyleneimines described in U.S. Pat. No. 3,597,265, the entire contents of which are incorporated herein by reference, including mixtures of two or more different polyalkyleneimines. As used herein, the phrase "reactive amino functionality" shall refer to any primary or secondary nitrogen atom in a polyalkyleneimine. Also, as used herein, the terms "polyalkyleneimine backbone" and "polyethyleneimine backbone" refer to that portion of the resulting polymer derivative in accordance with the present invention which is derived from the original polyalkyleneimine or polyethyleneimine starting material, respectively.

The polyalkyleneimine, or the polyalkyleneimine backbone (which terms when referring to molecular weight are used synonymously), will preferably have a molecular weight of from about 300 to about 70000, and more preferably from about 400 to about 2500. Thus, when referring to the molecular weight of the polyalkyleneimine backbone of a polymer derivative in accordance with the present invention, such weights include reactive hydrogen atoms removed from the original polyalkyleneimine starting material upon substitution with a substituent-compound. Particularly preferred polyalkyleneimines are polyethyleneimines. Preferred polyethyleneimines will have a molecular weight of from about 1000 to about 1800, with molecular weights of about 1200 being most preferred at least in part due to commercial availability and economics.

Polyalkyleneimines, and particularly polyethyleneimines, can be commercially obtained from a wide range of sources including, for example, Aceto Corp. (Nippon Shokubai, Japan) and BASF. However, synthetic production of such polyalkyleneimines can be accomplished by known polymerization methods such as, for example, acid catalyzed polymerization of applicable monomers, including but not limited to, ethyleneimine (aziridine) and substituted aziridines.

The number of reactive amino functionalities per mole that any particular polyalkyleneimine will have is a function of its molecular weight, and may further vary slightly at any one particular molecular weight. For example, a polyethyleneimine with a molecular weight of about 1200 will have about 28 or 29 total amino functionalities per mole of that polyethyleneimine. However, from about 7 to about 9 of the total number of amino functionalities are likely to be tertiary. Thus, the number of reactive amino groups in a mole of a polyethyleneimine with a molecular weight of about 1200 can vary from about 20 to 21, and may vary more. Standard and well-known analytical methods, such as, for example, $^{13}C$ NMR, can assist in a determination of the number of reactive amino functionalities per mole of a particular polyalkyleneimine, if unknown.

Carboxylic acids useful in accordance with the present invention preferably have from about 14 to about 20 carbon atoms, and more preferably from about 16 to about 18 carbon atoms. Carboxylic acids useful in accordance with the present invention may be linear or branched, and saturated or unsaturated. The acids used in accordance with the present invention can be obtained commercially or obtained from natural sources by distillation.

In preferred embodiments of the present invention, mixtures of two or more carboxylic acids are used. Accordingly, for example, two or more carboxylic acids having from about 14 to about 20 carbon atoms, and more preferably from about 16 to about 18 carbon atoms, can be reacted with a polyalkyleneimine. Preferred mixtures of carboxylic acids include two or more carboxylic acids having from 16 to 18 carbon atoms. A most preferred mixture of carboxylic acids includes palmitic acid and stearic acid in a ratio of approximately 50:50. Mixtures of carboxylic acids for use in accordance with the present invention may also contain unsaturated acids. Mixtures of carboxylic acids include, but are not limited to, naturally occurring mixtures of fatty acids such as those obtained from palm or coconut oils, often referred to as technical mixtures. Such technical mixtures may contain several different acids.

Polymer derivatives in accordance with the present invention comprise a polyalkyleneimine backbone having a number of reactive amino functionalities, and from about 20% to about 60% of the number of reactive amino functionalities are substituted with carboxylic acids. In preferred embodiments of the present invention, from about 25% to about 55% of the number of reactive amino functionalities in the polyalkyleneimine backbone are substituted. In increasingly more preferred embodiments of the present invention, from about 30% to about 50%, and from about 35% to about 45% of the number of reactive amino functionalities in the polyalkyleneimine backbone are substituted. Even more preferably, approximately 40% of the number of reactive amino functionalities will be substituted. While higher percentages will provide increased hydrophobicity, decreased residual amine value will also result and affinity for fiberglass diminishes accordingly.

Processes in accordance with the present invention, aimed at providing polymer derivatives satisfying such substituent criteria will preferably react a polyalkyleneimine with one or more carboxylic acids in accordance with the quantities described below.

Processes for preparing polymer derivatives in accordance with the present invention generally react a polyalkyleneimine with an amount of substituent-compounds comprising one or more carboxylic acids, wherein a total molar amount of the one or more carboxylic acids is used which is sufficient to derivatize the appropriate amount of the number of reactive amino functionalities per mole. The total molar amount of the one or more carboxylic acids which is sufficient is generally equivalent to the number of reactive amino functionalities to be substituted. For example, approximately 15 moles of total carboxylic acids would be reacted with a polyalkyleneimine backbone having 30 reactive amino functionalities per mole, to produce a polymer derivative having about 50% of the reactive amino functionalities substituted.

Accordingly, the substituent-compounds are generally reacted with the polyalkyleneimine in a molar ratio of from about 1 mole of substituent for every five reactive amino functionalities per mole of polyalkyleneimine to about 3 moles of substituent for every five reactive amino functionalities per mole of polyalkyleneimine. For example, in a preferred embodiment of the present invention where the polyalkyleneimine backbone comprises a polyethyleneimine having a molecular weight of about 1200 and a total of 20 reactive amino functionalities per mole of polyethyleneimine, the substituent-compounds are reacted with the polyethyleneimine in a substituent-compound:polyethyleneimine molar ratio of from about 4:1 to about 12:1, and preferably from about 5:1 to about 11:1, and increasingly more preferably from about 6:1 to about 10:1, and from about 7:1 to about 9:1, with a mole ratio of about 8:1 being most preferred. Slight excess of substituent-compound may be employed to provide favorable reaction conditions.

The polymer derivatives in accordance with the present invention can be preferably prepared by heating a substituent-compound(s) to a temperature of from about 60° C. to about 150° C., and more preferably about 110° C., and adding a polyalkyleneimine. The mixture of polyalkyleneimine and substituent-compound(s) is then heated and held at a temperature of from about 160° C. to about 220° C., preferably from about 180° C. to about 200° C., until no more substantial amounts of distillate are produced. The resulting partially amidated polyalkyleneimine is then cooled to a temperature of from about 80° C. to about 100° C., poured into a flake pan, and allowed to cool further.

After cooling, the resulting polymer derivatives, i.e., the partially amidated polyalkyleneimines, can be used to prepare fiber lubricant and/or sizing compositions in accordance with yet another embodiment of the present invention. The polymer derivative is preferably combined with water, and optionally emulsifying agents, to prepare an aqueous dispersion. Deionized water is preferably used. Preferred optional emulsifying agents include, for example, alkoxylated fatty alcohols. After the aqueous dispersion has been prepared, an acid(s) can be added to lower the pH of the basic dispersion. Acids which may be used include, but are not limited to, organic acids such as, for example, acetic acid, and mineral acids, such as, for example, sulfuric acid. The aqueous dispersion can then be transferred to a suitable container. The aqueous dispersion can be diluted to any suitable level dependent upon desired physical characteristics, such as viscosity. For example, an aqueous solution containing approximately 2–3% (solids) of the polymer derivative can be used to treat fibers directly. Alternatively, a 50% (solids) concentrate could be prepared and diluted prior to end-use to a desired concentration level.

Fiber lubricants in accordance with the present invention may also include additional optional ingredients, such as antioxidants. Antioxidants which may be included can be of any variety, however sodium hypophosphite is preferred. An antioxidant, such as sodium hypophosphite can be added to a fiberglass lubricant in accordance with the present invention in an amount of up to about 20% by weight, based on the solids content, and preferably about 10% by weight.

Fiber lubricants in accordance with the present invention provide excellent affinity for fiberglass fibers while exhibiting a high degree of hydrophobicity. The ability to repel moisture is significantly improved in the lubricants according to the present invention. Thus, the present invention also provides a method of lubricating fiber materials in which hydrophobicity is improved.

The method of lubricating fiber materials in accordance with the present invention includes providing a fiber material, preferably fiberglass, and contacting the fiber material with a polymer derivative according to any of the embodiments of the present invention. The fiber material can be contacted with the polymer derivative directly, or as part of a lubricant or sizing composition in the form of an aqueous dispersion. Excess lubricant/size may be drained, and the material is dried. The material may be brought into contact with the polymer derivative/lubricant composition in any known manner, including for example, immersion, spraying, and brushing. Spraying of a aqueous dispersion containing the polymer derivative onto the fiber is preferred. Drying can be accomplished by air drying, or by placing the fiber material in an oven. Heating times and temperatures can be adjusted depending on the oven or heat source used.

The present invention will now be illustrated in more detail by reference to the following specific, non-limiting examples.

EXAMPLE 1

A hydrophobic polyethyleneimine polyamide fiberglass lubricant was prepared by combining approximately 200.0 grams (0.167 moles) of EPOMIN® SP-012, a polyethyleneimine with a nominal molecular weight of 1200 (Aceto Corp., Lake Success, N.Y.; Nippon Shokubai, Japan), with 508.1 grams (1.88 moles) of melted EMERSOL® 132 stearic acid (Cognis Corp., Cincinnati, Ohio). The mixture was heated to about 190° C. and held at about that temperature for about 2.5 hours. The resulting polyethyleneimine polyamide was cooled to about 110° C., poured into a flake pan, and allowed to cool to room temperature.

A 10% dispersion of the polyethyleneimine polyamide was prepared from about 500.0 grams of the thus obtained product, about 4500 grams of deionized water, about 18.75 grams of TRYCOL® CSA-40 (Cognis Corporation, Cincinnati, Ohio), and about 56.25 grams of DROXOL® SA-30 (Cognis Corporation, Cincinnati, Ohio). The emulsifying agents were combined with the water, and the mixture stirred until all solids had dissolved. The solution was slowly heated to 70° C., with the solid polyamide being added in portions. Once the temperature reached 70° C., the white dispersion was allowed to cool to room temperature. The percent solids was measured, and sufficient deionized water was added to dilute the dispersion to 10% solids. A pH probe was inserted in the stirred dispersion, and succinic acid (Fisher Scientific) was added to lower the pH to about 6.5. Approximately 10.0 grams of succinic acid were required. The dispersion was stirred for several minutes to insure dissolution of the succinic acid, then the product was filtered through a 150 micron GAF bag into a bottle.

The 10% dispersion was diluted with deionized water to make a 1% dispersion. A clean glass slide was dipped into the 1% dispersion, and was allowed to dry. A 10 microliter drop of deionized water was placed on the treated portion of the slide, and the diameter of the drop was measured. The extent to which the drop spreads is a measure of the hydrophobicity of the coating: the smaller the spreading the more hydrophobic the coating. The diameter of the drop on the slide treated with the invention was 4.5 mm.

EXAMPLE 2

A hydrophobic polyethyleneimine polyamide fiberglass lubricant was prepared in accordance with the procedure set forth in Example 1, using approximately 200.0 grams (0.167 moles) of EPOMIN® SP-012 (Aceto Corp., Lake Success, N.Y.; Nippon Shokubai, Japan), and 362.2 grams (1.34 moles) of melted EMERSOL® 132 stearic acid (Cognis Corp., Cincinnati, Ohio). The lubricant hydrophobicity was evaluated in accordance with the procedure set forth in Example 1. The drop diameter was 5 mm.

COMPARATIVE EXAMPLE 1

A clean glass slide was treated with a 1% solution of a commercially available fiberglass lubricant, EMERY® 6717L (Cognis Corporation). After drying, a 10 microliter drop of deionized water was placed on the treated portion of the slide, and drop diameter measured. The drop diameter was 9 mm.

COMPARATIVE EXAMPLE 2

A clean glass slide was treated with a 1% solution of another commercially available fiberglass lubricant, ALU-BRASPIN® 226 (BASF Corporation). After drying, a 10 microliter drop of deionized water was placed on the treated portion of the slide, and drop diameter measured. The drop diameter was 10.5 mm.

CONTROL EXAMPLE

A 10 microliter drop of deionized water placed on a clean glass surface has a diameter of 5 mm.

The affinity of the lubricant coating according to Example 1 for the glass surface was subjectively evaluated to be as good or better than the Comparative Examples. One method of indirect, quantitative measurement for affinity is comparison of amine value. Other non-quantitative methods include duration of the coating under repetitive rinsing conditions.

It will be appreciated by those skilled in the art that changes could be made to the embodiments described above without departing from the broad inventive concept thereof It is understood, therefore, that this invention is not limited to the particular embodiments disclosed, but it is intended to cover modifications within the spirit and scope of the present invention as defined by the appended claims.

What is claimed is:

1. A polymer derivative comprising a polyalkyleneimine backbone having a number of reactive amino functionalities, each reactive amino functionality having at least one reactive hydrogen atom, wherein from 20% to 60% of the number of reactive amino functionalities have a substituent-compound substituted in place of the at least one reactive hydrogen atom, each substituent-compound independently selected from the group consisting of carboxylic acids having from about 14 to about 20 carbon atoms.

2. The polymer derivative according to claim 1, wherein the polyalkyleneimine backbone comprises a polyethyleneimine having a molecular weight of from about 400 to about 2500.

3. The polymer derivative according to claim 1, wherein the polyalkyleneimine backbone comprises a polyethyleneimine having a molecular weight of from about 1000 to about 1800.

4. The polymer derivative according to claim 1, wherein the substituent-compounds selected from the group consisting of carboxylic acids comprise a mixture of two or more $C_{14}$–$C_{20}$ carboxylic acids.

5. The polymer derivative according to claim 1, wherein each substituent-compound is independently selected from the group consisting of carboxylic acids having from about 16 to about 18 carbon atoms.

6. The polymer derivative according to claim 1, wherein the substituent-compounds selected from the group consisting of carboxylic acids comprise a mixture of two or more $C_{16}$–$C_{18}$ carboxylic acids.

7. The polymer derivative according to claim 6, wherein the mixture comprises palmitic acid and stearic acid in a ratio of about 50:50.

8. The polymer derivative according to claim 1, wherein from about 25% to about 55% of the number of reactive amino functionalities have a substituent-compound substituted in place of the at least one reactive hydrogen atom.

9. The polymer derivative according to claim 1, wherein from about 35% to about 45% of the number of reactive amino functionalities have a substituent-compound substituted in place of the at least one reactive hydrogen atom.

10. A polymer derivative comprising a polyethyleneimine backbone having a molecular weight of about 1200 and a number of reactive amino functionalities, each reactive amino functionality having at least one reactive hydrogen atom, wherein from about 35% to about 45% of the number of reactive amino functionalities have a substituent-compound substituted in place of the at least one reactive hydrogen atom, each substituent-compound independently selected from the group consisting of carboxylic acids having from about 16 to about 18 carbon atoms.

11. A polymer derivative prepared by a process comprising reacting a polyalkyleneimine having a number of reactive amino functionalities with an amount of substituent-compounds comprising one or more carboxylic acids having from about 14 to about 20 carbon atoms, under conditions sufficient to derivatize from 20% to 60% of the reactive amino functionalities with the substituent-compounds.

12. A process for preparing a polymer derivative, the process comprising: (a) providing a polyalkyleneimine having a number of reactive amino functionalities per mole, (b) reacting the polyalkyleneimine with an amount of substituent-compounds comprising one or more carboxylic acids having from about 14 to about 20 carbon atoms, wherein the amount of the substituent-compounds used is sufficient to derivatize from 20% to 60% of the number of reactive amino functionalities per mole.

13. The process according to claim 12, wherein the polyalkyleneimine comprises a polyethyleneimine having a molecular weight of from about 400 to about 2500.

14. The process according to claim 12, wherein the polyalkyleneimine comprises a polyethyleneimine having a molecular weight of from about 1000 to about 1800.

15. The process according to claim 12, wherein the substituent-compounds comprise a mixture of two or more $C_{14}$–$C_{20}$ carboxylic acids.

16. The process according to claim 12, wherein the substituent-compounds comprise one or more carboxylic acids having from about 16 to about 18 carbon atoms.

17. The process according to claim 12, wherein the substituent-compounds comprise a mixture of two or more $C_{16}$–$C_{18}$ carboxylic acids.

18. The process according to claim 17, wherein the mixture comprises palmitic acid and stearic acid in a ratio of about 50:50.

19. The process according to claim 12, wherein the amount of the substituent-compounds used is sufficient to derivatize from about 25% to about 55% of the number of reactive amino functionalities per mole.

20. The process according to claim 12, wherein the amount of the substituent-compounds used is sufficient to derivatize from about 35% to about 45% of the number of reactive amino functionalities per mole.

21. A process for preparing a polymer derivative, the process comprising: (a) providing a polyethyleneimine having a molecular weight of about 1200 and a number of reactive amino functionalities per mole, (b) reacting the polyethyleneimine with an amount of substituent-compounds comprising two or more carboxylic acids having from about 16 to about 18 carbon atoms, wherein the amount of the substituent-compounds used is sufficient to derivative from about 35% to about 45% of the number of reactive amino functionalities per mole.

22. A polymer derivative prepared by the process according to claim 12.

23. A polymer derivative prepared by the process according to claim 21.

24. A fiber lubricant composition comprising a polymer derivative according to claim 1.

25. A fiber lubricant composition comprising a polymer derivative according to claim 10.

26. A fiber lubricant composition comprising a polymer derivative according to claim 11.

27. A fiber lubricant composition comprising a polymer derivative according to claim 22.

28. A fiber lubricant composition comprising a polymer derivative according to claim 23.

29. A method of lubricating a fiber material comprising providing a fiber material and contacting the fiber material with a polymer derivative according to claim 1.

30. A method of lubricating a fiber material comprising providing a fiber material and contacting the fiber material with a polymer derivative prepared by the process according to claim 12.

* * * * *